United States Patent [19]

Friedman et al.

[11] 3,854,119

[45] Dec. 10, 1974

[54] VEHICLE PROXIMITY ALERTING MEANS

[75] Inventors: Benjamin Friedman, Pomona; Guy E. Adams, Monroe, both of N.Y.

[73] Assignee: Solitron Devices, Inc., Tappan, N.Y.

[22] Filed: Aug. 11, 1972

[21] Appl. No.: 279,993

[52] U.S. Cl............... 340/33, 325/62, 333/70
[51] Int. Cl. ............................................. H04b 1/16
[58] Field of Search ....... 340/22, 32, 33, 34, 258 D, 340/311, 328, 329; 325/29, 64, 62, 364; 343/5 PD, 7 ED, 112 CA; 333/70 R

[56] References Cited
UNITED STATES PATENTS

| | | | |
|---|---|---|---|
| 3,233,217 | 2/1966 | Bost, Jr. | 340/33 |
| 3,293,600 | 12/1966 | Gifft | 340/33 |
| 3,416,129 | 12/1968 | Dean | 340/32 |
| 3,532,986 | 10/1970 | Gelushia et al. | 340/33 |

Primary Examiner—Kathleen H. Claffy
Assistant Examiner—Randall P. Myers
Attorney, Agent, or Firm—Richard G. Geib

[57] ABSTRACT

This invention relates to a system for alerting vehicles of the ground, air and water type of the closing proximity and immediate proximity of other such vehicles and more particularly comprises means to receive and detect amplitude modulated signals and identify them to operate switching means for alerting devices such as audio means and visual means such as light emitting diodes, panel displays or neon lights in accordance with the amplitude of said signals within a predetermined signature pass band in a periodic manner which is related to a separation range of the vehicles.

22 Claims, 2 Drawing Figures

3,854,119

VEHICLE PROXIMITY ALERTING MEANS

BACKGROUND OF INVENTION

The present invention relates to warning systems for use on vehicles which will permit one vehicle, at least, to be apprised of the presence of another such vehicle in its more or less general vicinity.

Considering present day vehicles which tend to insulate the operators and passengers from the outside surroundings and also in consideration of atmospheric and terrain conditions which singularly and in many instances collectively interfere with safe operation of vehicles in the air and on the ground as well as with ships and boats, many have attempted to provide electronic devices to provide information concerning such means in and about each other. An early patented effort as to automobiles is found in U.S. Pat. No. 1,612,427 and another later patent with reference to alerting the operator of an automobile of the presence of a train is seen in U.S. Pat. No. 3,182,288.

SUMMARY OF INVENTION

It is a primary object of the present invention to promote public safety by the incorporation of an electronic warning system within vehicles to alert the operator thereof in responding to a potential and immediate danger by the presence of another vehicle. More particularly, the present invention is concerned with providing a vehicle operator with a visual and/or audio alert of the presence of another vehicle that may be a potential threat and with a similar alert that there is an actual threat to the safety of his vehicle.

It is another primary purpose of this invention to provide an improved system to alert operators of any type of means of conveyance first of the potential danger of another vehicle and then, as and if such danger becomes real, that an actual danger exists. It may thus be appreciated that this invention will provide to the operator of a vehicle added time to react to a dangerous condition.

In that this invention is concerned with the utilization of radio waves to provide the warnings aforementioned it is an attendant object to have the inventive means selective to only such radio wave energy as is intended for vehicle warning whereby spurious signals which are not indicative of any threat to the vehicle are not able to activate the inventive means.

A still further object of this invention is to provide means whereby warning signals from a range greater than that posing a threat to the vehicle are not able to activate the inventive means.

Other objects and further advantages of this invention will become clear from a reading of the following description.

DRAWING DESCRIPTION

FIG. 1 portrays a situation evidencing a dramatic need for the subject invention; and FIG. 2 illustrates in schematic form an electronic device activated by identifiable radio wave energy of preselected frequency and strength carried by an airplane, automobile, boat, ship, train or truck.

DETAILED DESCRIPTION

Figure 1:
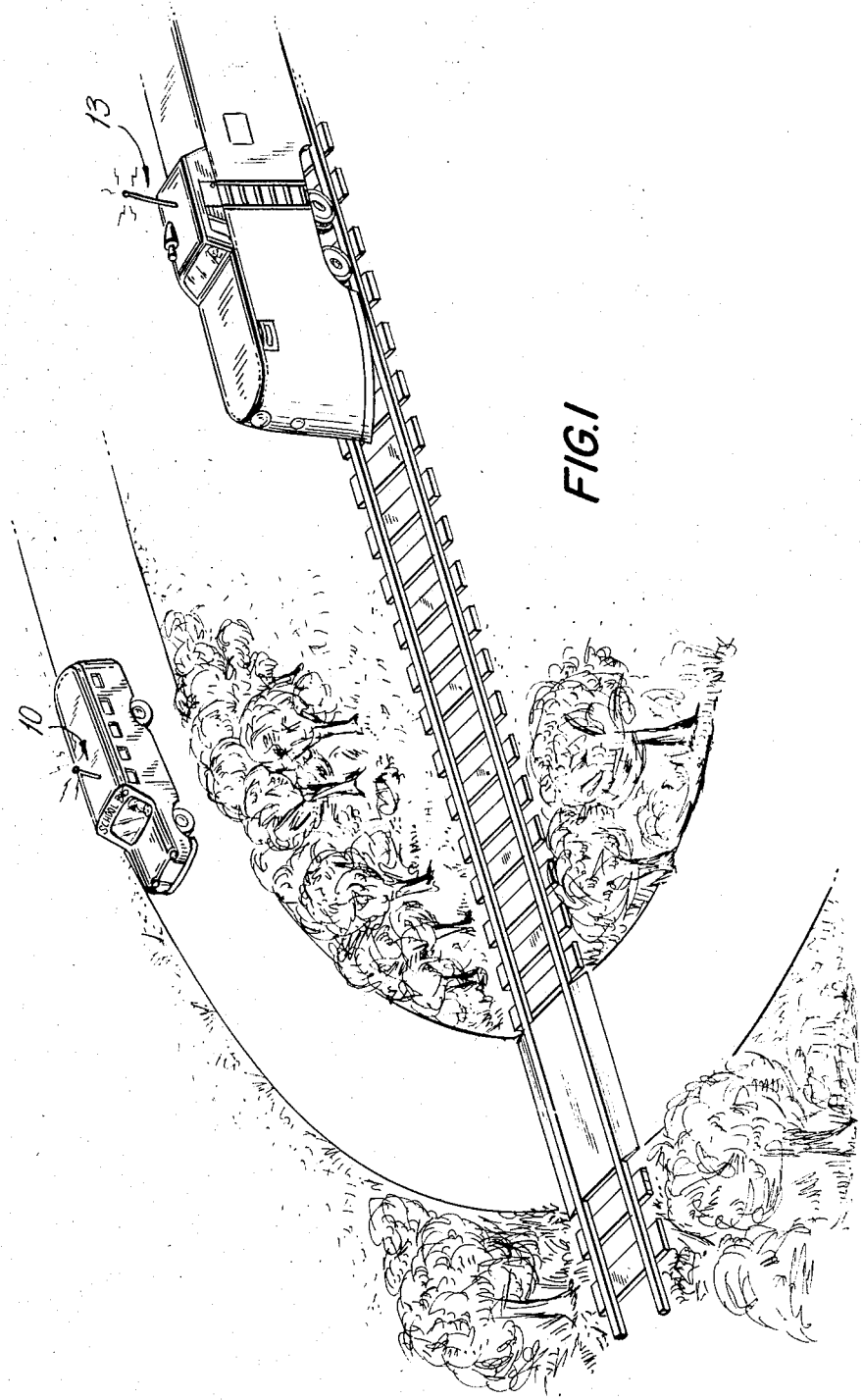
Figure 2:
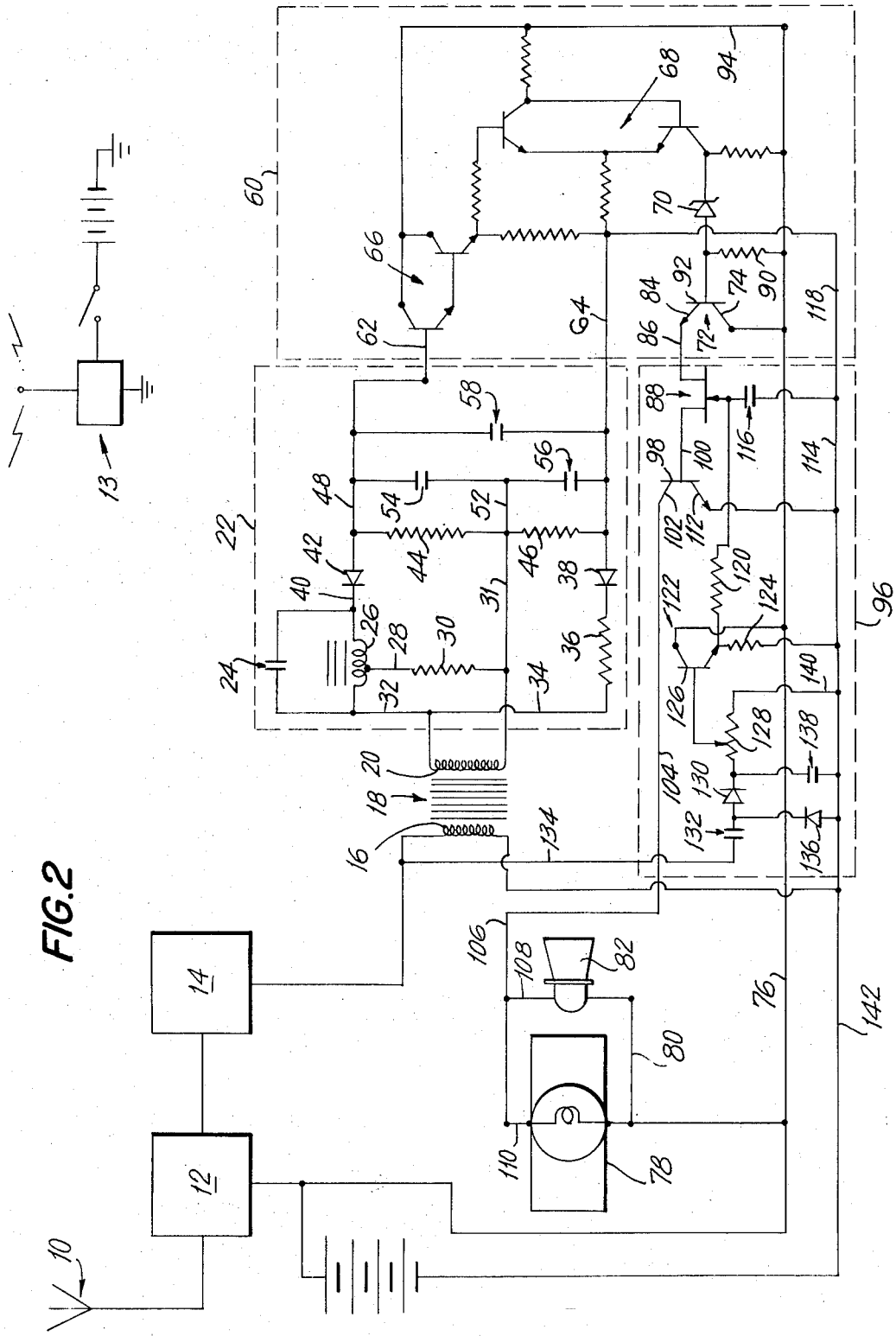

The device of the invention operates by means of a proximity unit which is installed on a vehicle such as described above. This proximity unit comprises an antenna 10 connected to a receiver 12 delivering radio frequency energy as transmitted by radio means 13 on another vehicle at a predetermined frequency to a detector 14. Signals of the predetermined frequency create a current in primary 16 of coupling transformer 18 whose secondary 20 is connected to a frequency discriminator circuit 22.

The circuit 22 is designed to be functional at a specific audio frequency such that it may not be operable by radio appratus employed for purposes other than intended in this invention. This circuit 22 includes series impedance comprising the parallel combination of capacitor 24 and inductor 26. Inductor 26 is center tapped by lead 28 which is via resistor 30 connected to lead 31 from the opposite side of primary 20 from that connected by lead 32 to the series impedance. Lead 34 connects lead 32 to resistor 36 and diode 38, and lead 40 connects the series impedance to diode 42. Lead 31 is connected to resistors 44 and 46 bridging leads 48 and 50. The frequency discriminator circuit is completed by connecting capacitor 58 between leads 48 and 50 to smooth the output therefrom.

An electronic triggering circuit 60 is connected by leads 62 and 64 to the frequency discriminator 22. This electronic triggering network includes a Darlington amplifier 66 which provides extremely high impedance and operates a Schmidt trigger 68 which provides a positive latching on and off to eliminate signal hovering. A zener diode 70 connects the Schmidt trigger to a switching transistor 72 whose collector 74 is connected to lead 76 terminating at the visual indicator 78, and by means of lead 80 being connected to audio means 82. The emitter 84 is connected by lead 86 to unijunction transistor 88, and a resistor 90 bridges the connection from the zener diode 70 to base 92 and lead 94 from the Darlington amplifier 66 to the junction of lead 76 to collector 74.

The audio means 82 used thus far have comprised buzzers, horns, whereas the visual indicators have comprised neon lights, light emitting diodes and panel displays.

An amplitude detector 96 is connected to triggering circuit 60 including the unijunction transistor 88 whose waveform is improved by connecting base 98 of NPN transistor to the lead 100 from unijunction transistor 88 whereby collector 102 delivers the output via lead 104 to lead 106 connected by leads 108 and 110 to the audio and visual indicators, respectively. The emitter 112 is connected by lead 114 to capacitor 116 and lead 118. Resistor 120 and capacitor 116 form an RC network controlling the unijunction transistor in accordance with the variably conductive transistor 122 having its collector connected to lead 76 and its emitter connected to resistor 120 and via resistor 124 to the power source. Base 126 of transistor 122 is connected by means of a variable resistor 128 to the detector 14 via diode 130, capacitor 132 and lead 134. Diode 136, capacitor 138 and lead 140 bridge the input from detector 14 to the lead 142 from the power source.

In operation, antenna 10 receives an amplitude modulated signal which is delivered to receiver 12 and detector 14 which, if of the right carrier frequency and modulation signature, is passed thence to the discriminator circuit 22 and the amplitude detector 96. In the former a resonator circuit will further identify this signal within a predetermined pass band. If the signal is within the pass band of this discriminator it will be provided as a positive potential to the triggering circuit 60 appearing at the base 62. If it is without the pass band and off-resonance a negative potential will be provided to hold-off the triggering circuit. At the same time, and regardless of the discriminator 22, the signal from detector 14 will be provided to amplitude detector 96. If the signal is identifiable to be within the resonance determined by the pass band of the discriminator it will be seen that the detector 96 will, dependant upon the strength of the signal, permit the triggering of the visual and/or audio alarm in a periodic manner until the signal from detector 14 is strong enough to represent the summit of the resonance curve whereby the visual and/or audio alarms 78 and 82 are held on to signify very imminent proximity of the signal source to antenna 10.

Therefore, the device above-described provides a simple, commercially feasible, compact and highly effective means to indicate separation range of vehicles employing the system and the closing of this separation until each is within the immediate vicinity whereupon the system alerts the vehicle operator of that fact also.

It should, however, be appreciated that the foregoing is only considered illustrative of but one preferred embodiment of this invention. For example there may be provided means to switch between transmit and receive to eliminate interference in one vehicle of one part of the system with another. Further the frequency discriminator may be duplicated several times in order to refine the activating signature pass band. Therefore, since numerous modifications and changes will readily occur to those skilled in the art, it is not desired to limit the invention to the exact construction and arrangement shown and described. Accordingly, it is intended that all suitable modifications and equivalents may be resorted to falling within the scope of the invention as claimed.

What is claimed is:

1. In a vehicular system for enabling vehicular proximity warning to be accomplished in accordance with an amplitude modulated signal, the combination comprising:
   transmitter means carried by one vehicle, said transmitter means sending the amplitude modulated signal of a predetermined carrier frequency with a modulation signature;
   receiver means carried by a second vehicle, said receiver means being adapted to receive and detect said amplitude modulated signal of a predetermined carrier frequency and modulation signature as transmitted by said transmitter means;
   resonator circuit means tuned to a predetermined pass band to provide a positive potential when identifying said signal and a negative potential otherwise to operate switching means in said resonator circuit means, said resonator circuit means being connected to means to control an output of said switching means in accordance with the strength of said amplitude modulated signal as received by said receiver means;
   a power source for energizing said receiver means and for providing energy to said resonator circuit means and said means to control output of said switching means; and
   alerting means connected to said power source and said resonator circuit means and said means to control the output of said switching means to be operated thereby to provide range information to said second vehicle in reference to the proximity of said first vehicle.

2. In a vehicular system for enabling vehicular proximity warning according to claim 1 wherein said receiver means includes an antenna, a radio receiver and detector providing a current from said power source and said resonator circuit further includes a coupling transformer that is operated by said current provided by said detector for actuation of said resonator circuit when said detector detects said predetermined carrier frequency.

3. In a vehicular system for enabling vehicular proximity warning according to claim 2 wherein the means to control the output of switching means includes an amplitude detecting circuitry interposed between the switching means and the alerting means connected to the receiving means so as to operate the alerting means in a periodic manner whose off-period decreases as said signals from said transmitting means become closer-in to said receiving means until a predetermined closeness is reached whereby said alerting means is held-on until one or the other or both of said first or second vehicles begin to increase the range between them.

4. The structure of claim 3 wherein said alerting means is a combination of audio and visual means connected in parallel.

5. The structure of claim 2 and further characterized by having the resonator circuit comprised of a series impedance including an inductance and a capacitor with a center tap for the inductance connecting same across a secondary winding of the coupling transformer.

6. The structure of claim 5 wherein said alerting means is a combination of audio and visual means connected in parallel.

7. The structure of claim 1 wherein the means to control an output of said switching means is further characterized as an amplitude detector having a unijunction transistor connected to said switching means whose output is improved by an NPN transistor connected directly to said alerting means.

8. The structure of claim 7 wherein the amplitude detector is further characterized as including a variably conductive transistor between said alerting means and said power source.

9. The structure of claim 8 wherein the variably conductive transistor is connected to said unijunction transistor by an RC network and to said receiver means by a variable resistor.

10. The structure of claim 9 wherein the alerting means is a combination of an audio and visual means connected in parallel.

11. The structure of claim 9 wherein the signals from said receiver means are filtered by a capacitor circuit to require a strength which represents a range of a predetermined closeness before the actuation of the alerting means commences.

12. The structure of claim 11 wherein the alerting means is a combination of audio and visual means connected in parallel.

13. The structure of claim 1 wherein said alerting means is a combination of audio and visual devices connected in parallel.

14. Apparatus to receive amplitude modulated signals and detect those of a predetermined carrier frequency and modulation signature for operating a device, said apparatus comprising:

a frequency discriminator operatively connected to said means to receive and detect, said discriminator including means and circuitry to identify said signals within a predetermined pass band to provide in such case an output of a positive potential if within the pass band and a negative potential if without said pass band;

amplitude detection means connected to said means to receive and detect, said amplitude detection means being connected by a capacitor circuit connected to a variable resistor connected to a transistor means whereby said amplitude detection means is operative to function as a result of said signals when said signals are of a predetermined strength to pass said transistor means whereby said signals as pass are representative of a predetermined distance from the source thereof;

a semiconductor circuit operatively connected to said frequency discriminator to be controlled thereby to be biased on by a positive potential and off by a negative potential;

means connecting said amplitude detector and said semiconductor circuit to the device to operate the device in a pulsating or steady manner in accordance with signal pulses from said transistor means; and a power source for said apparatus.

15. The structure of claim 14 wherein the frequency discriminator includes a resonator circuit tuned to a predetermined pass band.

16. The structure of claim 15 and further characterized by said means including a unijunction transistor having one base connected to said semiconductor circuit and another base connected to an NPN transistor connected between the device and the power source.

17. The structure of claim 16 wherein said semiconductor circuit comprises a Schmidt trigger whose output is connected to the unijunction transistor and a Darlington amplifier receiving the potential from said frequency discriminator for the control of said Schmidt trigger.

18. The structure of claim 17 wherein the resonator circuit comprises a series impedance with an inductance thereof center tapped by a conductor connected to the frequency discriminator circuit so as to provide a negative potential to the base of the Darlington amplifier when said signals are without the predetermined pass band.

19. The structure of claim 18 wherein the device is a combination of visual and audio means.

20. The structure of claim 14 wherein the device is a combination of parallel connected audio and visual means.

21. In connection with a coupling transformer actuated by signals from a radio receiver means, in a vehicular proximity warning system a frequency discriminator connected to a secondary winding of the coupling transformer, said frequency discriminator comprising:

a series impedance connected to one side of said secondary winding;

a first conductor leading from the other side of said winding;

a second conductor leading from the series impedance to a first output terminal;

a third conductor leading from the series impedance to a second output terminal;

a first resistance and capacitance means connecting said first conductor and said second conductor;

a second resistance and capacitance means connecting said first conductor and said third conductor;

a wave form smoothing capacitance connected between said second and third conductors; and a fourth conductor tapped to said series impedance and said first conductor whereby the potentials at said first output terminal and said second output terminals may be changed in accordance with resonance of said series impedance.

22. The structure of claim 21 wherein said series impedance comprises a capacitor and an inductor that is center tapped by said fourth conductor.

* * * * *